Figure 1:
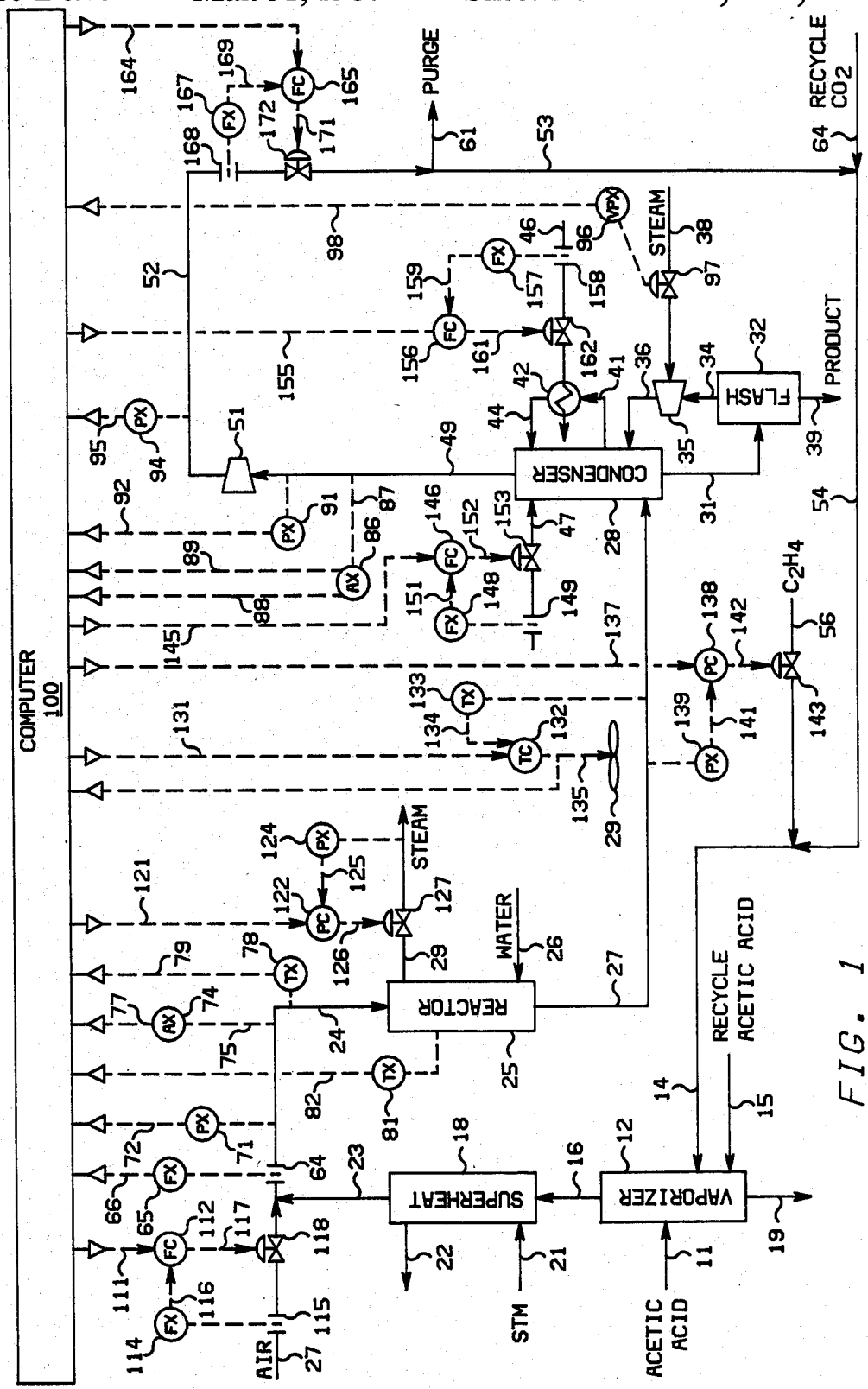

United States Patent [19]

Stewart et al.

[11] Patent Number: 4,654,801

[45] Date of Patent: Mar. 31, 1987

[54] CONTROL OF A VINYL ACETATE PROCESS

[75] Inventors: William S. Stewart; John D. Hottovy, both of Bartlesville, Okla.

[73] Assignee: Phillips Petroleum Company, Bartlesville, Okla.

[21] Appl. No.: 676,758

[22] Filed: Nov. 30, 1984

[51] Int. Cl.[4] .......................... G06F 15/46; G05D 7/00
[52] U.S. Cl. ..................................... 364/500; 364/502; 422/110
[58] Field of Search ............... 364/500, 501, 502, 496, 364/557, 183; 427/111, 110; 55/19, 48

[56] References Cited

U.S. PATENT DOCUMENTS

| | | | |
|---|---|---|---|
| 2,974,182 | 3/1961 | Van Pool | 260/683.42 |
| 3,288,845 | 11/1966 | Schaeffer | 260/497 |
| 3,714,237 | 1/1973 | Calcagno et al. | 260/497 A |
| 3,957,883 | 5/1976 | von Elbe | 260/810 B |
| 4,087,622 | 5/1978 | Nakamura et al. | 560/245 |
| 4,156,632 | 5/1979 | Roscher et al. | 203/14 |
| 4,218,191 | 8/1980 | Stewart | 417/19 |
| 4,350,569 | 9/1982 | Furr | 203/2 |
| 4,353,783 | 10/1982 | Roscher et al. | 203/14 |
| 4,367,354 | 1/1983 | Dibiano | 585/259 |
| 4,370,492 | 1/1983 | Wunder et al. | 560/245 |
| 4,371,499 | 2/1983 | Bard et al. | 422/111 |
| 4,371,944 | 2/1983 | Stewart et al. | 364/502 |
| 4,435,192 | 3/1984 | Stewart | 55/19 |
| 4,488,239 | 12/1984 | Agarwal | 364/500 |
| 4,491,924 | 1/1985 | Agarwal | 364/500 |
| 4,589,072 | 5/1986 | Arimatsu | 364/473 |

OTHER PUBLICATIONS

Liptak; B. G., Instrument Engineers Handbook, vol. II, pp. 1282–1286.

Primary Examiner—Parshotam S. Lall
Assistant Examiner—Gregory M. Doudnikoff
Attorney, Agent, or Firm—French and Doescher

[57] ABSTRACT

An integrated control system for a vinyl acetate process. A desired production rate of vinyl acetate is achieved by maintaining a desired reactor temperature. At the same time, the concentration of oxygen in the vinyl acetate reactor and condenser are maximized and the reactor pressure is maximized, all in a safe manner, so as to increase the selectivity of the process to the production of vinyl acetate. Also, the overall process is controlled so as to improve the efficiency of energy and materials usage.

12 Claims, 2 Drawing Figures

CONTROL OF A VINYL ACETATE PROCESS

This invention relates to a vinyl acetate process. In one aspect, this invention relates to an integrated control system for a vinyl acetate process. In another aspect this invention relates to a control system for maintaining a desired production rate of vinyl acetate while also maintaining the concentration of oxygen in the vinyl acetate reactor and vinyl acetate condenser as close as possible to high limits so as to increase selectivity. In still another aspect this invention relates to a control system for maintaining a high pressure in the vinyl acetate reactor without exceeding a process constraint so as to increase selectivity.

The process for the production of vinyl acetate involves the reaction of acetic acid, oxygen and ethylene to produce vinyl acetate. As with any chemical manufacturing process, it is desirable to maintain the desired production rate while also maximizing, to the extent possible, the selectivity of the process to the production of vinyl acetate. It is also desirable to operate a process safely which is extremely important in the case of a process for producing vinyl acetate which is known to involve a dangerous reaction. Also, it is desirable to operate any process efficiently from the standpoint of energy and materials usage.

It is thus an object of this invention to provide a control system for a vinyl acetate process. Particular objectives addressed by the control system are the maintenance of a desired production rate while increasing oxygen content so as to increase selectivity, maintenance of a high reactor pressure so as to increase selectivity and enhancement of the efficiency of the vinyl acetate process.

In accordance with the present invention, a desired production rate of vinyl acetate is achieved by maintaining a desired reactor temperature. At the same time, the concentration of oxygen in the vinyl acetate reactor and condenser are maximized and the reactor pressure is maximized, all in safe manner, so as to increase the selectivity of the process to the production of vinyl actate. Also, the overall process is controlled so as to improve the efficiency of energy and materials usage. Thus, an integrated control system for a vinyl acetate process is provided.

Figure 2:
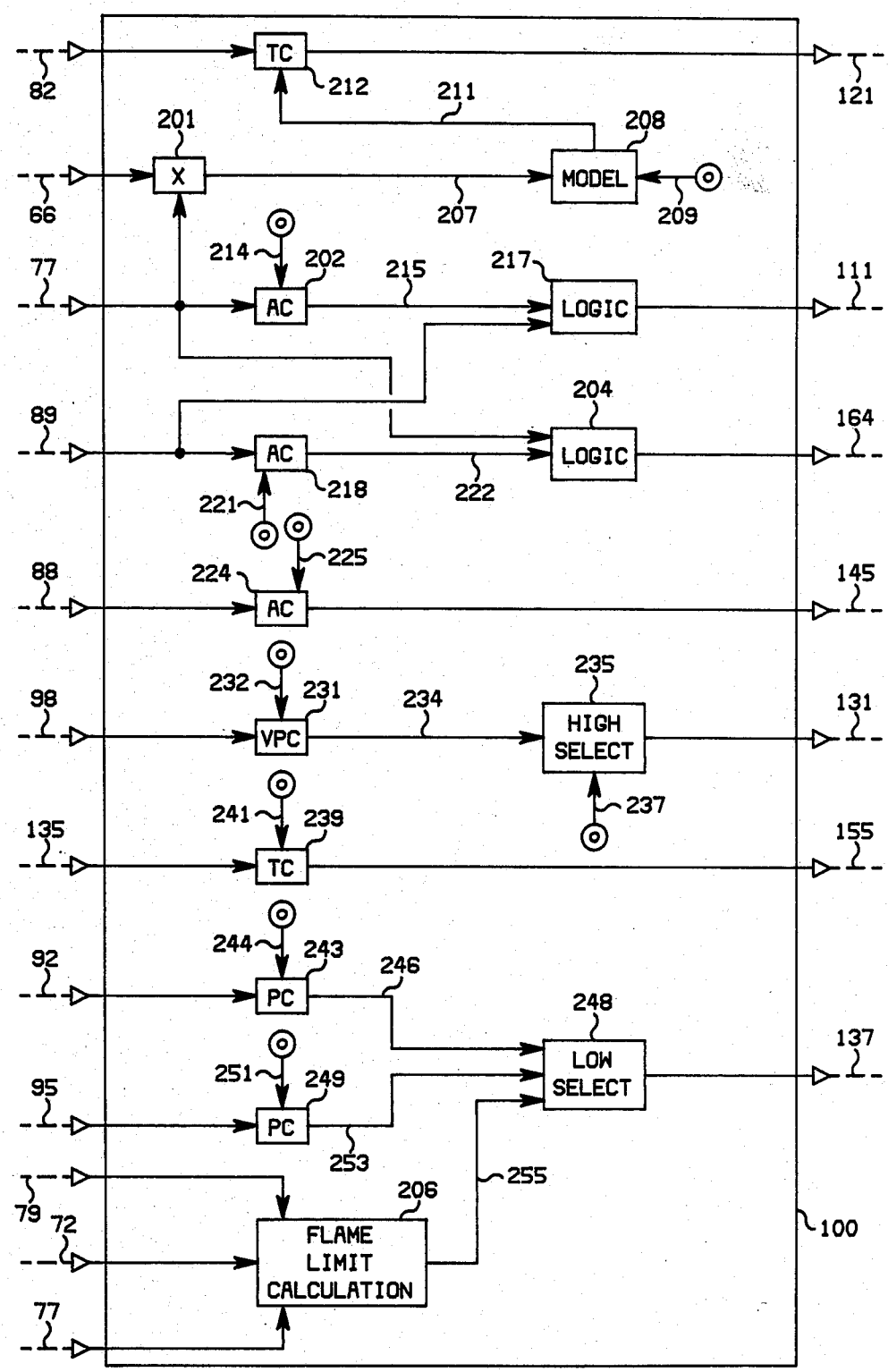

Other objects and advantages of the invention will be apparent from the foregoing brief description of the invention and the claims as well as the detailed description of the drawings which are briefly described as follows:

FIG. 1 is diagrammatic illustration of a vinyl acetate process with the associated control system of the present invention; and FIG. 2 is a flow diagram of the computer logic utilized to generate the control signals illustrated in FIG. 1 based on the measured process variables illustrated in FIG. 1.

The invention is illustrated and described in terms of a specific vinyl acetate process configuration. However, the invention is applicable to any vinyl acetate process configuration where the basic process flow is essentially as illustrated in FIG. 1.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that, if a flow is measured in pneumatic form, it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, makeup acetic acid is provided through conduit 11 to the vaporizer 12. Also, carbon dioxide and ethylene are provided to the vaporizer 12 through conduit 14 as will be described more fully hereinafter. Recycle acetic acid is provided to the vaporizer 12 through conduit 15.

The feed to the vaporizer 12 is vaporized and the vapor portion is provided through conduit 16 to the super heat section 18. Any liquid remaining in the vaporizer 12 is withdrawn through conduit 19.

Steam is provided to the super heat section 18 through conduit 21 and is withdrawn through conduit 22.

The super heated vapor from the super heat section 18 is provided through the combination conduits 23 and 24 to the reactor 25. Air is typically provided through the combinations of conduits 27 and 24 to the reactor 25 to provide the required oxygen. Essentially, the feed flowing through conduit 24 to the reactor 25 will contain acetic acid, oxygen, nitrogen, argon, water vapor, carbon dioxide and ethylene. The nitrogen, argon, water vapor and carbon dioxide are impurities.

In the reactor 25, the following reactions take place.

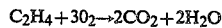

It is desirable to maximize the selectivity to the production of vinyl acetate which is accomplished by the present control system as will be described more fully hereinafter.

Water is provided as a cooling fluid to the reactor 25 through conduit 26. This water is withdrawn as steam through conduit 29.

The reaction effluent is withdrawn from reactor 25 through conduit 27 and is provided to the condenser 28. The reaction effluent flowing through conduit 27 is cooled by fin fan coolers represented by fin fan cooler 29.

Condensed materials in the condenser 28 are withdrawn through conduit 31. These condensed materials are principally vinyl acetate, water and acetic acid. The condensed material flowing through conduit 31 is flashed in the flash tank 32 and the vapors are removed from the flash tank 32 through conduit 34, compressed by the compressor 35 and recycled to the condenser 28 through conduit 36. Drive steam is provided to the compressor 35 through conduit 38.

The product stream is removed from the flash tank 32 through conduit 39. This product stream, which contains the vinyl acetate, is provided to a purification section which is not illustrated. The vinyl acetate is separated out and any remaining, unreacted acetic acid is recycled to the vaporizer 12 through conduit 15 as previously described.

Uncondensed vapors flow to the upper section of the condenser 28. Some of such vapors are withdrawn from the condenser 28 through conduit 41, passed through the heat exchanger 42 and recycled to the condenser 28 through conduit 44. A cooling fluid is provided to the heat exchanger 42 through conduit 46. This cooling of the vapors provides for additional condensation and recovery of vinyl acetate.

The vapors also contact a wash liquid provided to the condenser 28 through conduit 47. This provides for additional removal of vinyl acetate and acetic acid.

Remaining vapors from the condenser 28 are removed through conduit 49. This vapor stream will principally contain ethylene, argon, nitrogen, carbon dioxide and oxygen.

Vapors flowing through conduit 49 are compressed in the compressor 51 and are then recycled to the vaporizer 12 through the combination of conduits 52, 53, 54 and 14. Makeup ethylene is also provided to the vaporizer 12 through the combination of conduits 56 and 14.

Nitrogen and argon must be removed at the rate which they enter the process. Also, carbon dioxide must be removed at a rate which equals its production rate in the reactor. This is accomplished by a purge system which is fed through conduit 61 but is not illustrated. Some carbon dioxide is recycled and is provided through the combination of conduit 62, 53 and 14 to the vaporizer 12.

The vinyl acetate process described to this point is a conventional vinyl acetate process. It is noted that additional process streams would typically be present. However, such additional process streams have not been illustrated for the sake of simplicity because such additional process stream are known to those skilled in the art and play no part in the description of the invention. Also, additional equipment such as pumps, additional heat exchangers, additional control components, etc. which would typically be associated with the vinyl acetate process have not been illustrated since these additional components play no part in the description of the present invention.

In general, control of the vinyl acetate process according to the present invention is accomplished by using process measurements to establish seven control signals. The process measurements will first be described and then the use of the control signals will be described. Thereafter the manner in which the process measurements are utilized to generate the control signals will be described.

Flow transducer 65 in combination with flow sensor 64, which is operably located in conduit 24, provides an output signal 66 which is representative of the actual flow rate of the feed to reactor 25. Signal 66 is provided from flow transducer 65 as an input to computer 100.

Pressure transducer 71 in combination with a pressure sensing device, which is operably located in conduit 24, provides an output signal 72 which is representative of the actual inlet pressure to the reactor 25. Signal 72 is provided from the pressure transducer 71 as an input to computer 100.

Analyzer transducer 74 is in fluid communication with conduit 24 through conduit 75. Analyzer transducer 74 is preferably a chromatographic analyzer such as the Model 102 process chromatograph manufacture by Applied Automation, Inc. A sample of the fluid flowing through conduit 24 is provided to analyzer transducer 74 through conduit 75 and analyzer transducer 74 provides an output signal 77 which is representative of such analysis. Components analyzed for are oxygen, carbon dioxide, nitrogen and acetic acid. All of these concentrations are represented by signal 77 for the sake of convenience. Signal 77 is provided as an input to computer 100.

Temperature transducer 78 in combination with a temperature measuring device such as a thermocouple, which is operably located in conduit 24, provides an output signal 79 which is representative of the reactor inlet temperature. Signal 79 is provided from the temperature transducer 78 as an input to computer 100.

Temperature transducer 81 in combination with a temperature sensing device such as a thermocouple, which is operably located in reactor 25, provides an output signal 82 which is representative of the temperature in the reactor 25. Signal 82 is provided from temperature transducer 81 as an input to computer 100.

Analyzer transducer 86 is in fluid communication with conduit 49 and conduit 87. Analyzer transducer 86 may be the same type of analyzer as analyzer 74. Analyzer transducer 86 is provided with a sample of the fluid flowing through conduit 49 and provides two output signals 88 and 89 which are respectively representative of the concentration of vinyl acetate and oxygen in the fluid flowing through conduit 49. Both signals 88 and 89 are provided from the analyzer transducer 86 as inputs to computer 100.

Pressure transducer 91 in combination with a pressure sensing device, which is operably located in conduit 49, provides an output signal 92 which is representative of the actual suction pressure for the compressor 51. Signal 92 is provided from the pressure transducer 91 as an input to computer 100.

In like manner, pressure transducer 94 in combination with a pressure sensing device, which is operably located in conduit 52, provides an output signal 95 which is representative of the actual discharge pressure for compressor 51. Signal 95 is also provided from pressure transducer 94 to computer 100.

Valve position transducer 96 is operably connected to the control valve 97 which is operably located in conduit 38. Valve position transducer 96 provides an output signal 98 which is representative of the actual position of control valve 97. Signal 98 is provided from the valve position transducer 96 as an input to computer 100.

In response to the described inputs, computer 100 calculates seven control signals. These seven control signals are re-calculated (updated) periodically by the computer 100. Also, the previously calculated values (one time period earlier) will generally be retained in memory for comparison or use as needed. These signals and the manner in which they are utilized follows:

Signal 111 is representative of the flow rate of air through conduit 27 required to maintain a desired concentration of oxygen in the reactor 25 (this flow rate may also be considered a desired flow rate of oxygen). As will be more fully described hereinafter, this desired oxygen concentration is substantially the maximum permissable concentration of oxygen from the standpoint of safety. For the particular process to which the invention was applied, the oxygen limit (dry basis) in the reactor was 8.2 volume percent. Signal 111 is provided from computer 100 as the set point input to the flow controller 112.

Flow transducer 114 in combination with the flow sensor 115, which is operably located in conduit 27, provides an output signal 116 which is representative of the actual flow rate of air through conduit 27. Signal 116 is provided as the process variable input to the flow controller 112.

In response to signals 111 and 116, the flow controller 112 provides an output signal 117 which is responsive to the difference between signals 111 and 116. Signal 117 is scaled so as to be representative of the position of control valve 118, which is operably located in conduit 27, required to maintain the actual flow rate of air through conduit 27 substantially equal to the desired flow rate represented by signal 111. Signal 117 is provided as a control signal from the flow controller 112 to the control valve 118 and the control valve 118 is manipulated in response thereto.

Signal 121 is representative of pressure of the steam flowing through conduit 29 required to maintain a desired temperature in the reactor 25. As will be described more fully hereinafter, this desired temperature is a temperature which will maintain a desired production rate of vinyl acetate. Signal 121 is provided from computer 100 as the set point input to the pressure controller 122.

Pressure transducer 124 in combination with a pressure sensing device, which is operably located in conduit 29, provides an output signal 125 which is representative of the actual pressure of the steam flowing through conduit 29. Signal 125 is provided from pressure transducer 124 as the process variable input to the pressure controller 122.

In response to signals 121 and 125, the pressure controller 122 provides an output signal 126 which is responsive to the difference between signals 121 and 125. Signal 126 is scaled so as to be representative of the position of the control valve 127, which is operably located in conduit 29, required to maintain the actual steam pressure substantially equal to the desired steam pressure. Signal 126 is provided as a control signal from the pressure controller 122 to the control valve 127 and the control valve 127 is manipulated in response thereto. Controlling the steam pressure results in control of the cooling water flow rate and thus results in control of the temperature in reactor 25.

Signal 131 is representative of the desired temperature of the reaction effluent flowing through conduit 27. The manner in which this desired temperature is determined is described more fully hereinafter. Signal 131 is provided from the computer 100 as the set point input to the temperature controller 132.

Temperature transducer 133 in combination with a temperature measuring device such as a thermocouple, which is operably located in conduit 27, provides an output signal 134 which is representative of the actual temperature of the effluent flowing through conduit 27 after cooling by the fin fan cooler 29. Signal 134 is provided as the process variable input to the temperature controller 132.

In response to signals 131 and 134, the temperature controller 132 provides an output signal 135 which is responsive to the difference between signals 131 and 134. Signal 135 is scaled so as to be representative of the pitch of the fin fan cooler 29 required to maintain the actual temperature of the reaction effluent entering the condenser 28 substantially equal to the desired temperature represented by signal 131. Signal 135 is provided from the temperature controller 29 as a control signal for the fin fan cooler 29 and the pitch of the fin fan cooler 29 is manipulated in response thereto. Signal 135 is also provided as an input to computer 100.

Signal 137 is representative of the desired pressure at the outlet of the reactor 25 or of the reaction effluent flowing through conduit 27. As has been previously stated, this desired pressure will be the maximum safe pressure for the reactor 25 which will not violate process constraints. Signal 137 is provided from computer 100 as the set point input to the pressure controller 138.

Pressure transducer 139 in combination with a pressure sensing device, which is operably located in conduit 27 upstream of the fin fan cooler 29, provides an output signal 141 which is representative of the actual pressure of the reaction effluent withdrawn from the reactor 25 at the reactor outlet. Signal 141 is provided from the pressure transducer 139 as the process variable input to the pressure controller 138.

In response to signals 137 and 141, the pressure controller 138 provides an output signal 142 which is responsive to the difference between signals 137 and 141. Signal 142 is scaled so as to be representative of the position of the control valve 143, which is operably located in conduit 56, required to maintain a flow rate of ethylene which will maintain the actual pressure at the outlet of the reactor 25 substantially equal to the desired pressure represented by signal 137. Signal 142 is provided as a control signal from pressure controller 138 to control valve 143 and control 143 is manipulated in response thereto.

Signal 145 is representative of the flow rate of the washing liquid through conduit 47 required to maintain the actual concentration of vinyl acetate in the vapor flowing through conduit 49 substantially equal to a desired concentration. It is noted in this connection that it is not economically feasible to remove all vinyl acetate from the vapor flowing through conduit 49 and thus there will be some desired vinyl acetate concentration from an economic standpoint. Signal 145 is provided as the set point input to the flow controller 146.

Flow transducer 148 in combination with the flow sensor 149, which is operably located in conduit 47, provides an output signal 151 which is representative of the actual flow rate of the washing liquid through conduit 47. Signal 151 is provided from the flow transducer 148 as the process variable input to the flow controller 146.

In response to signals 145 and 151, the flow controller 146 provides an output signal 152 which is responsive to the difference between signals 145 and 151. Signal 152 is scaled so as to be representative of the position of the control valve 153, which is operably located in conduit 47, required to maintain the actual flow rate of the washing liquid through conduit 47 substantially equal to the desired flow rate represented by signal 145. Signal 152 is provided as a control signal from flow controller 146 to control valve 153 and control valve 153 is manipulated in response thereto.

Signal 155 is representative of the flow rate of cooling fluid through conduit 46 required to maintain a desired temperature in the condenser 28. As will be more fully described hereinafter, the cooling fluid flowing through conduit 46 is utilized to supplement the cooling provided by the fin fan cooler 29. Signal 155 is provided as the set point input to the flow controller 156.

Flow transducer 157 in combination with the flow sensor 158, which is operably located in conduit 46, provides an output signal 159 which is representative of the actual flow rate of cooling fluid through conduit 46. Signal 159 is provided from flow transducer 157 as the process variable input to the flow controller 156.

In response to signals 155 and 159, flow controller 156 provides an output signal 161 which is responsive to the difference between signals 155 and 159. Signal 161 is scaled so as to be representative of the position of the control valve 162, which is operably located in conduit 46, required to maintain the actual flow rate of the cooling fluid through conduit 46 substantially equal to the desired flow rate represented by signal 155. Signal 161 is provided as a control signal from flow controller 156 and control valve 162 is manipulated in response thereto.

Signal 164 is representative of the flow rate of the recycle fluid flowing through conduit 52 required to maintain a desired oxygen concentration in condenser 28. The manner in which the control of the flow rate of the recycle fluid accomplishes this will be described more fully hereinafter. As was the case for the oxygen concentration in the reactor 25, the oxygen concentration for the condenser 28 will preferably be set at a maximum safe concentration so as to increase selectivity. For the particular vinyl acetate process to which the present invention was applied, this concentration was 5.0 volume % (dry basis). Signal 164 is provided from computer 100 as the set point input to flow controller 165.

Flow transducer 167 in combination with the flow sensor 168, which is operably located in conduit 52, provides an output signal 169 which is representative of the actual flow rate of the recycle fluid through conduit 52. Signal 169 is provided from the flow transducer 167 as the process variable input to the flow controller 165.

In response to signals 164 and 169, the flow controller 165 provides an output signal 171 which is responsive to the difference between signals 164 and 169. Signal 171 is scaled so as to be representative of the position of the control valve 172, which is operably located in conduit 52, required to maintain the actual flow rate of the recycle fluid through conduit 52 substantially equal to the desired flow rate represented by signal 64. Signal 171 is provided as a control signal from flow controller 165 to control valve 172 and control valve 172 is manipulated in response thereto.

Referring now to computer 100 and the manner in which the process measurements are utilized to generate the control signals, signal 66, which is representative of the total flow rate of reactants to the reactor inlet, is provided as an input to the multiplying block 201. The portion of signal 77 which is representative of the concentration of oxygen in the feed stream flowing through conduit 24 is provided as an input to multiplying block 201, as the process variable input to the analyzer controller 202 and as an input to the logic block 204.

Signal 66 is multiplied by signal 77 to establish signal 207 which is representative of the actual flow rate of oxygen to the reactor 25. Signal 207 is provided from the multiplying block 201 as an input to the model block 208. The model block 208 is also provided with a set point signal 209 which is representative of the desired production rate of vinyl acetate.

Any suitable model may be utilized to determine the relationship between reactor temperature and production rate. A preferred model is given by equation (1).

$$(F_o/PR_{sp}) = a_1(T_r - 100)^3 + b_1 \qquad (1)$$

where $F_0$ = the rate of oxygen to the reactor (signal 207);
$PR_{sp}$ = the production rate set point (signal 209);
$T_r$ = the temperature in the reactor 25; and
$a_1$ and $b_1$ are constants.

$F_o$ and $PR_{sp}$ are measured or set. $a_1$ and $b_1$ are determined empirically by measuring the reactor temperature and noting the production rate for various flow rates of oxygen. For the particular process to which the present invention was applied, $a_1$ was found to be $5.313 \times 10^7$ and $b_1$ was found to be 0.2821.

Equation (1) is solved in the model block 208 to determine $T_r$ which is the reactor temperature required to maintain the production rate of vinyl acetate represented by signal 209. This required temperature is provided as signal 211 to the temperature controller 212 and is utilized to set the temperature controller 212.

The temperature controller 212 is also provided with signal 82 which is representative of the actual reactor temperature. In response to signals 82 and 211, the temperature controller establishes an output signal 121 which is responsive to the difference between signals 82 and 211. Signal 121 is scaled so as to be representative of the steam pressure required to maintain the actual reactor inlet temperature substantially equal to the desired reactor inlet temperature represented by signal 211. Signal 121 is provided as an output from computer 100 and is utilized as previously described.

The analysis controller 202 is also provided with a set point signal 214 which is representative of the desired concentration of oxygen in the feed flowing to the reactor 25. In response to signal 77 and 214, the analysis controller 202 provides an output signal 215 which is responsive to the difference between signals 277 and 214. Signal 215 is scaled so as to be representative of the flow rate of air through conduit 27 required to maintain the actual oxygen concentration at the reactor inlet substantially equal to the desired oxygen concentration represented by signal 214. Signal 215 is provided as a first input to the logic block 217.

Signal 89, which is representative of the actual oxygen concentration in the vapor flowing through conduit 49, is provided as the process variable input to the analysis controller 218 and is also provided as an input to the logic block 217. In response to signals 215 and 89, the logic block 217 provides an output signal 111 which is a set point for the flow rate of air through conduit 27 as has been previously described. The logic utilized to generate signal 111 is as follows:

If the oxygen concentration represented by signal 89 is at a high limit for the oxygen concentration in the vapor flowing through conduit 49 and if the flow rate represented by signal 215 is greater than the flow rate (signal 111) generated by computer 100 in the previous calculation one time period earlier, then signal 111 is set equal to the magnitude which signal 111 had as of the previous calculation in computer 100. (signal 111 is not changed). However, if the oxygen concentration represented by signal 89 is not greater than the high limit for such oxygen concentration, then signal 111 is set equal to signal 215.

Analysis controller 218 is also provided with a set point signal 221 which is representative of the desired concentration of oxygen in the vapor flowing through conduit 49 from the condenser 28. In response to signals 89 and 221, the analysis controller 218 provides an output signal 222 which is responsive to the difference between signals 89 and 221. Signal 222 is scaled so as to be representative of the flow rate of the recycle stream through conduit 52 required to maintain the actual oxygen concentration in the overhead from the condenser 28 substantially equal to the desired oxygen concentration represented by signal 221. Signal 222 is provided from the analysis controller 218 as an input to logic block 204.

Signal 164, which is a set point for the flow rate of the recycle stream through conduit 52 as previously described, is provided as an output from the logic block 204 in response to signals 77 and 222. The logic utilized to establish signal 164 is as follows:

If the oxygen concentration represented by signal 77 is at a high limit for such oxygen concentration and if the flow rate represented by signal 222 is less than the flow rate (signal 164) generated by the previous calculation in computer 100, then signal 164 remains equal to the flow rate established by the previous calculation (no change). However, if the oxygen concentration represented by signal 77 is not greater than such high limit, then signal 164 is set equal to signal 222.

An example of the operation of control signals 121, 111 and 164 is as follows:

If an increase in the vinyl acetate production rate is called for, set point signal 209 will be increased and the production rate model will increase the desired reactor temperature represented by signal 211. This will cause an increase in the reactor temperature. The increase in reactor temperature will decrease the oxygen concentration in the condenser column overhead. The decrease in oxygen concentration in the condenser column overhead will cause the analyzer controller 221 to increase the gas recycle rate. The increase in the gas recycle rate will decrease the oxygen concentration in the reactor feed. The decrease in oxygen concentration in the reactor feed will cause the analyzer controller 202 to increase the flow rate of air so as to increase the flow rate of oxygen to the reactor.

It is noted that it is desired for the control system to contain certain logic elements from the standpoint of safety. Such logic elements would prevent certain control action from taking place. As an example, the recycle gas flow must not be decreased when the oxygen concentration in the reactor feed is at its high limit as this will create a pocket of gas with high oxygen concentration in the reactor feed. Likewise, the fresh oxygen flow rate must not be increased when the oxygen concentration in the condenser column overhead is at a high limit because this would create a pocket of gas with high oxygen concentration in the condenser column overhead. Also, the analysis controllers 202 and 218 are preferably nonlinear such that control actions which increase oxygen concentration are slow but control actions which decrease oxygen concentration are rapid. Also, dead time compensation is preferably applied to the control of the reactor temperature.

Signal 88, which is representative of the actual concentration of vinyl acetate in the fluid flowing through conduit 49, is provided as the process variable input to the analysis controller 224. The analysis controller 224 is also provided with a set point input 225 which is representative of the desired concentration of vinyl acetate in the overhead from the condenser 28.

In response to signals 88 and 225, the analysis controller 224 establishes signal 145 which is responsive to the difference between signals 88 and 225. Signal 145 is scaled so as to be representative of the flow rate of the wash liquid through conduit 47 required to maintain the actual concentration of vinyl acetate in the overhead from the condenser 28 substantially equal to the desired concentration represented by signal 225. Signal 145 is provided as an output from computer 100 and is utilized as previously described.

The control accomplished by signals 131 and 145 is highly interactive and is described together hereinafter. The objective of the control is to minimize the temperature at the bottom of the condenser 28 so as to minimize the requirement for use of the wash liquid and to also transfer as much load as is possible from the column intercooler represented by heat exchanger 42 to the fin fan coolers represented by cooler 29 because it is cheaper to remove heat via the fin fan coolers than via the intercolumn intercooler. However, reducing the column bottom temperature will cause the liquid to retain more gas which, upon flashing, will add to the load on compressor 35. Thus, the loading on compressor 35 is a limitation to reducing the column bottom temperature.

Signal 98 which is representative of the actual position of the control valve 97 is provided as the process variable input to the valve position controller 231. Signal 98 is indicative of the loading on the compressor 35.

The valve position controller 231 is also provided with a set point signal 232 which is representative of the maximum desired open position for control valve 97, or stated in other words, the maximum desired loading on the compressor 35. In response to signals 98 and 232, the valve position controller 231 provides an output signal 234 which is responsive to the difference between signals 98 and 232. Signal 234 is scaled so as to be representative of the temperature of the reaction effluent entering the condenser 28 required to maintain the actual loading on compressor, as represented by signal 98, substantially equal to maximum desired loading on the compressor, as represented by signal 232. Signal 234 is provided from the valve position controller 231 as an input to the high select block 235.

The high select block 235 is also provided with signal 237 which is representative of a low limit on the temperature of the reaction effluent entering the condenser 28. In response to signal 234 and 237, the high select block 235 establishes signal 131 which is a set point for the temperature of the reaction effluents entering the condenser 28. Essentially, signal 131 is equal to the higher of signals 234 and 237.

Signal 131 will typically be equal to signal 237 such that the temperature in the bottom of the condenser 28 is maintained at a desired low limit. However, if such maintainence causes the loading on the compressor 35 to begin to exceed a desired maximum, signal 131 will become equal to signal 234 and such control will be maintained until the loading on the compressor 35 is reduced to the point that the condenser bottom temperature can again be maintained at a low limit by basing control on signal 237.

Signal 135, which is the control signal provided as output from temperature controller 132, is provided as the process variable input to the temperature controller 239. The temperature controller 239 is also provided with a set point signal 241 which is representative of a high limit on the output from the temperature controller 132. Essentially, signal 241 is representative of the maximum cooling which can be provided by the fin fan cooler 29.

In response to signals 135 and 241, the temperature controller 239 provides an output signal 155 which is responsive to the difference between signals 135 and 241. Signal 155 is representative of the flow rate of cooling fluid to the column intercooler 42 required to maintain the actual temperature in the bottom of the condenser 28 substantially equal to a desired temperature as previous described. However, it should be recognized that signal 155 will cause control valve 162 to open only when sufficient cooling cannot be provided by the fin fan cooler 29. Thus, the objective of transferring as much cooling load as possible to the fin fan cooler 29 is accomplished. Also, this objective is accomplished without overloading compressor 35.

It is desired to maintain the reactor pressure as high as possible to increase the selectivity of the reaction to vinyl acetate. However, this must be accomplished within process constraints. Essentially, these process constraints are a limitation on the suction pressure for compressor 51, a limitation on the compressor discharge pressure and a explosion limit on the reactor pressure. It is thus desired to maintain the reactor pressure as high as possible without exceeding any of these limits.

Signal 92, which is representative of the actual suction pressure for compressor 51, is provided as the process variable input to the pressure controller 243. The pressure controller 243 is also provided with a set point signal 244 which is representative of the maximum desired suction pressure. In response to signals 92 and 244, the pressure controller 243 provides an output signal 246 which is responsive to the difference between signals 92 and 244. Signal 246 is scaled so as to be representative of the reactor pressure required to maintain the actual suction pressure for compresor 51 substantially equal to the maximum desired suction pressure represented by signal 244. Signal 246 is provided as a first input to the low select block 248.

In like manner, signal 95, which is representative of the actual discharge pressure for compressor 51, is provided as an input to the pressure controller 249. The pressure controller 249 is also provided with a set point signal 251 which is representative of the maximum desired discharge pressure for compressor 51.

In response to signals 95 and 251, the pressure controller 249 provides an output signal 253 which is responsive to the difference between signals 95 and 251. Signal 253 is scaled so as to be representative of the reactor pressure required to maintain the actual discharge pressure for compressor 51 substantially equal to the desired discharge pressure represented by signal 251. Signal 253 is provided from the pressure controller 249 as a second input to the low select 248.

Signal 79, which is representative of the actual temperature at the reactor inlet, is provided as an input to the flame limit calculation block 206. Also, signal 72, which is representative of the actual pressure at the reactor inlet, and signal 77 which, in this case, is representative of the mol fraction of oxygen, carbon dioxide, nitrogen and acetic acid contained in the feed flowing to the reactor inlet are provided as inputs to the flame limit calculation block 206.

The flame limit calculation block 206 is utilized to calculate the maximum safe pressure for the reactor 25. Any suitable equation could be utilized for this calculation. The preferred set of equations is given by equations (2) and (3).

$$P = e^z \qquad (2)$$

$$Z = 5.225 - (34.376)X_{O2} - 6.875 \times 10^{-3}T - 0.516\\(X_{CO2} + X_{N2}) + 7.563\, X_{HAC} \qquad (3)$$

where

P = reactor pressure limit;

$X_{O2}$ = the mol fraction of oxygen in the feed to reactor 25;

$X_{CO2}$ = the mole fraction of carbon dioxide in the feed to reactor 25;

$X_{N2}$ = the mol fraction of nitrogen in the feed to reactor 25;

$X_{HAC}$ = the mol fraction of acetic acid in the feed to reactor 25; and

T = the temperature of the feed to reactor 25. The constants for use in equation (3) are again determined experimentally.

Signal 255, which is representative of the pressure P in equation (2), is provided from the flame limitation calculation block 206 as a third input to the low select 248.

In response to signals 246, 253 and 255, signal 137 is established by the low select 248. Signal 137 is the set point for the pressure controller 138 and will be equal to the lower of signals 246, 253 and 255. Thus, a maximum pressure will be maintain in reactor 25 without exceeding a process limitation or creating a hazard.

The invention has been described in terms of a preferred embodiment as illustrated in FIGS. 1 and 2. Specific components which can be used in the practice of the invention as illustrated in FIG. 1, such as flow transducers 65, 114, 148, 157 and 167; flow sensors 64, 115, 149, 158 and 168; flow controllers 112, 146, 156 and 165; pressure transducers 71, 124, 91, 94 and 139; pressure controllers 122 and 138; temperature transducers 78, 81 and 133; temperature controller 132; valve position transducer 96; and control valves 118, 127, 153, 143, 97, 162 and 172 are each well-known commercially available control components such as are described in length in Perry's *Chemical Engineers Handbook*, 4th Edition, chapter 22, McGraw-Hill. It is also noted that some of the controllers illustrated in FIG. 1 could be implemented on the digital computer or that some of the controllers illustrated in FIG. 2 could be implemented by use of analog controllers.

While the invention has been described in terms of the presently preferred embodiment, reasonable variations and modifications are possible by those skilled in the art. Such modifications and variations are within the scope of the described invention and the appended claims.

That which is claimed is:

1. Apparatus comprising:

a vinyl acetate reactor;

means for providing a feed stream containing acetic acid, ethylene, and oxygen to said reactor;

means for establishing a first signal representative of the actual flow rate of oxygen to said reactor;

means for establishing a second signal representative of the desired production rate of vinyl acetate for said reactor;

means for establishing a third signal representative of the reactor temperature required to maintain the actual vinyl acetate production rate for said reactor substantially equal to the desired vinyl acetate production rate represented by said second signal in response to said first signal and said second signal;

means for establishing a fourth signal representative of the actual reactor temperature;

means for comparing said third signal and said fourth signal and for establishing a fifth signal which is responsive to the difference between said third signal and said fourth signal, wherein said fifth signal is scaled so as to be representative of the amount of cooling which must be provided to said reactor in order to maintain the actual reaction temperature substantially equal to the desired reaction temperature represented by third signal; and means for manipulating the cooling of said reactor in response to said fifth signal.

2. Apparatus in accordance with claim 1 additionally comprising:

a condenser column;

cooling means;

means for withdrawing the reaction effluent from said reactor and for passing said reaction effluent through said cooling means to said condenser column;

means for withdrawing a bottom product from said condenser column, wherein said bottom product contains a substantial portion of the vinly acetate and unreacted acetic acid contained in said reaction effluent withdrawn from said reactor;

means for withdrawing an overhead vapor stream from said condenser column, wherein said overhead vapor stream contains the non-condensed portion of the reaction effluent withdrawn from said reactor;

means for recycling at least a portion of said overhead vapor stream withdrawn from said condenser column to said reactor;

means for establishing a sixth signal representative of the actual concentration of oxygen in said feed stream flowing to said reactor;

means for establishing a seventh signal representation of the actual concentration of oxygen in the overhead vapor stream withdrawn from said condenser column;

means for establishing an eighth signal representative of the desired concentration of oxygen in said feed stream flowing to said reactor;

means for comparing said sixth signal and said eighth signal and for establishing a ninth signal which is responsive to the difference between said sixth signal and said eighth signal, wherein said ninth signal is scaled so as to be representative of the rate at which fresh oxygen must be added to said feed stream flowing to said reactor in order to maintain the actual concentration of oxygen in said feed stream flowing to said reactor substantially equal to the desired concentration represented by said eighth signal;

means for establishing a tenth signal representative of a set point for the rate at which fresh oxygen will be added to said feed stream flowing to said reactor in response to said seventh signal and said ninth signal;

means for manipulating the rate at which fresh oxygen is added to said feed stream flowing to said reactor in response to said tenth signal;

means for establishing an eleventh signal representative of the desired concentration of oxygen in the overhead vapor steam withdrawn from said condenser column;

means for comparing said seventh signal and said eleventh signal and for establishing a twelfth signal which is responsive to difference between said seventh signal and said eleventh signal, wherein said twelfth signal is scaled so as to be representative of the rate at which the overhead vapor stream withdrawn from said condenser column must be recycled to said reactor in order to maintain the actual concentration of oxygen in the overhead vapor stream withdrawn from said condenser column substantially equal to the desired concentration represented by said eleventh signal;

means for establishing a set point signal for the recycle of the overhead vapor stream withdrawn from said condenser column to said reactor in response to said sixth signal and said twelfth signal; and means for manipulating the recycle of said overhead vapor stream to said reactor in response to said set point signal.

3. Apparatus in accordance with claim 2 wherein a first compressor is utilized to compress the overhead vapor stream withdrawn from said condenser column prior to recycling the overhead vapor stream withdrawn from said condenser column to said reactor and wherein said feed stream to said reactor additionally contains carbon dioxide and nitrogen, said apparatus additionally comprising;

means for establishing a fourteenth signal representative of the actual suction pressure for said first compressor;

means for establishing a fifteenth signal representative of a high limit for the suction pressure for said first compressor;

means for comparing said fourteenth signal and said fifteenth signal and for establishing a sixteenth signal which is responsive to difference between said fourteenth signal and said fifteenth signal, wherein said sixteenth signal is scaled so as to be representative of the pressure in said reactor which will maintain the actual suction pressure for said first compressor substantially equal to the desired suction pressure represented by said sixteenth signal;

means for establishing a seventeenth signal representative of the actual discharge pressure for said first compressor;

means for establishing an eighteenth signal representative of a high limit for the discharge pressure for said first compressor;

means for comparing said seventeenth signal and said eighteenth signal and for establishing a nineteenth signal which is responsive to difference between said seventeenth signal and said eighteenth signal, wherein said nineteenth signal is scaled so as to be representative of the pressure in said reactor which will maintain the actual suction pressure for said first compressor substantially equal to the desired suction pressure represented by said nineteenth signal;

means for establishing a twentieth signal representative of the temperature of said feed stream flowing to said reactor;

means for establishing a twenty-first signal representative of the concentration of carbon dioxide in said feed stream flowing to said reactor;

means for establishing a twenty-second signal representative of the concentration of nitrogen in said feed stream flowing to said reactor;

means for establishing a twenty-third signal representative of the concentration of the acetic acid in said feed stream flowing to said reactor;

means for establishing a maximum safe operating pressure for said reactor in response to said twentieth through twenty-third signals and said sixth signal;

a low select;

means for providing said sixteenth signal, said nineteenth signal and said twenty-fourth signal to said low select, wherein said low select establishes a twenty-fifth signal as an output signal and wherein said twenty-fifth signal is equal to the one of said sixteenth, said nineteenth and said twenty-fourth signals which is representative of the lowest pressure; and means for manipulating the pressure in said reactor in response to said twenty-fifth signal.

4. Apparatus in accordance with claim 2 additionally comprising:

means for providing a wash liquid to said condenser column, wherein said wash liquid removes vinyl acetate from the vapors contained in said condenser column;

means for establishing a fourteenth signal representative of the actual concentration of vinyl acetate in the overhead vapor stream withdrawn from said condenser column;

means for establishing a fifteenth signal representative of the desired concentration of vinyl acetate in said overhead vapor stream;

means for comparing said fourteenth signal and said fifteenth signal and for establishing a sixteenth signal which is responsive to the difference between said fourteenth signal and said fifteenth signal, wherein said sixteenth signal is scaled so as to be representative of the flow rate of said wash fluid to said condenser column required to maintain the actual concentration of vinyl acetate in the overhead vapor stream withdrawn from said condenser column substantially equal to the desired concentration represented by said fifteenth signal; and means for manipulating the flow of said wash fluid to said condenser column in response to said sixteenth signal.

5. Appartus in accordance with claim 2 additionally comprising:

a flash tank;

means for providing said bottom product from said condenser column to said flash tank;

means for withdrawing a product stream containing vinyl acetate and unreacted acetic acid from said flash tank;

a second compressor;

means for providing the overhead vapors from said flash tank to the suction inlet of said second compressor;

means for providing the compressed vapors withdrawn from the discharge outlet of said second compressor to said condenser column;

means for establishing a fourteenth signal representative of the loading on said second compressor;

means for establishing a fifteenth signal representative of the maximum desired loading on said second compressor;

means for comparing said fourteenth signal and said fifteenth signal and for establishing a sixteenth signal representative of the temperature of the reaction effluent entering said condenser column required to maintain the actual loading on said second compressor substantially equal to the maximum desired loading represented by said fifteenth signal;

means for establishing a seventeenth signal representative of a low limit on the temperature of the reaction effluent entering said condenser column;

a high select;

means for providing said sixteenth signal and said seventeenth signal to said high select, wherein said high select establishes an eighteenth signal equal to the higher of said sixteenth and said seventeenth signals;

means for establishing a nineteenth signal representative of the actual temperature of the feed entering said condenser column;

means for comparing said said eighteenth and said nineteenth signals and for establishing a twentieth signal which is responsive to the difference between said eighteenth signal and said nineteenth signal, wherein said twentieth signal is scaled so as to be representative of the cooling which must be applied to the reaction effluent withdrawn from said reactor in order for the actual temperature of the reaction effluent entering said condenser column to be equal to the desired temperature represented by said eighteenth signal; and means for manipulating the cooling of the reaction effluent withdrawn from said reactor in response to said twentieth signal.

6. Apparatus in accordance with claim 5 additionally comprising:

a heat exchanger;

means for withdrawing fluid from said condenser column and for recycling the thus withdrawn fluid through said heat exchanger to said condenser column;

means for providing a cooling fluid to said heat exchanger;

means for establishing a twenty-first signal representative of the high limit on the magnitude of said twentieth signal;

means for comparing said twentieth signal and said twenty-first signal and for establishing a twenty-second signal which is responsive to the difference between said twentieth signal and twenty-first signal, wherein said twenty-second signal is scaled so as to be representative of the flow rate of cooling fluid to said heat exchanger required to maintain a desired feed inlet temperature to said condenser column if sufficient cooling is not available for the reaction effluent withdrawn from said reactor; and means for manipulating the flow of said cooling fluid to said heat exchanger in response to said twenty-second signal.

7. A method for controlling a vinyl acetate process in which a feed stream containing acetic acid, ethylene and oxygen is provided to a vinyl acetate reactor and reacted to produce vinly acetate, said method comprising the steps of:

establishing a first signal representative of the actual flow rate of oxygen to said reactor;

establishing a second signal representative of the desired production rate of vinyl acetate for said reactor;

establishing a third signal representative of the reactor temperature required to maintain the actual vinyl acetate production rate for said reactor substantially equal to the desired vinyl acetate production rate represented by said second signal in response to said first signal and said second signal;

establishing a fourth signal representative of the actual reactor temperature;

comparing said third signal and said fourth signal and establishing a fifth signal which is responsive to the difference between said third signal and said fourth signal, wherein said fifth signal is scaled so as to be representative of the amount of cooling which must be provided to said reactor in order to maintain the actual reaction temperature substantially equal to the desired reaction temperature represented by third signal; and manipulating the cooling of said reactor in response to said fifth signal.

8. A method in accordance with claim 7 wherein the reaction effluent from said reactor is withdrawn, cooled and provided to a condenser column, wherein a bottom product containing a substantial portion of the vinyl acetate and unreacted acetic acid contained in said reaction effluent withdrawn from said reactor is withdrawn from said condenser column, wherein an overhead vapor stream containing the non-condensed portion of the reaction effluent withdrawn from said reactor is withdrawn from said condenser column, and wherein at least a portion of said overhead vapor stream withdrawn from said condenser column is recycled to said reactor, said method comprising the additional steps of:

establishing a sixth signal representative of the actual concentration of oxygen in said feed stream flowing to said reactor;

establishing a seventh signal representation of the actual concentration of oxygen in the overhead vapor stream withdrawn from said condenser column;

establishing an eighth signal representative of the desired concentration of oxygen in said feed stream flowing to said reactor;

comparing the sixth signal and said eighth signal and establishing a ninth signal which is responsive to the difference between said sixth signal and said eighth signal, wherein said ninth signal is scaled so as to be representative of the rate at which fresh oxygen must be added to said feed stream flowing to said reactor in order to maintain the actual concentration of oxygen in said feed stream flowing to said reactor substantially equal to the desired concentration represented by said eighth signal;

establishing a tenth signal representative of a set point for the rate at which fresh oxygen will be added to said feed stream flowing to said reactor in response to said seventh signal and said ninth signal;

manipulating the rate at which fresh oxygen is added to said feed stream flowing to said reactor in response to said tenth signal;

establishing an eleventh signal representative of the desired concentration of oxygen in the overhead vapor stream withdrawn from said condenser column;

comparing said seventh signal and said eleventh signal and establishing a twelfth signal which is responsive to difference between said seventh signal and said eleventh signal, wherein said twelfth signal is scaled so as to be representative of the rate at which the overhead vapor stream withdrawn from said condenser column must be recycled to said reactor in order to maintain the actual concentration of oxygen in the overhead vapor stream withdrawn from said condenser column substantially equal to the desired concentration represented by said eleventh signal;

establishing a set point signal for the recycle of the overhead vapor stream withdrawn from said condenser column to said reactor in response to said sixth signal and said twelfth signal; and manipulating the recycle of said overhead vapor stream to said reactor in response to said set point signal.

9. A method in accordance with claim 8 wherein a first compressor is utilized to compress the overhead vapor stream withdrawn from said condenser column prior to recycling the overhead vapor stream withdrawn from said condenser column to said reactor and wherein said feed stream to said reactor additionally contains carbon dioxide and nitrogen, said method additionally comprising the steps of:

establishing a fourteenth signal representative of the actual suction pressure for said first compressor;

establishing a fifteenth signal representative of a high limit for the suction pressure for said first compressor;

comparing said fourteenth signal and said fifteenth signal and establishing a sixteenth signal which is responsive to difference between said fourteenth signal and said fifteenth signal, wherein said sixteenth signal is scaled so as to be representative of the pressure in said reactor which will maintain the actual suction pressure for said first compressor substantially equal to the desired suction pressure represented by said sixteenth signal;

establishing a seventeenth signal representative of the actual discharge pressure for said first compressor;

establishing an eighteenth signal representative of a high limit for the discharge pressure for said first compressor;

comparing said seventeenth signal and said eighteenth signal and for establishing a nineteenth signal which is responsive to difference between said seventeenth signal and said eighteenth signal, wherein said nineteenth signal is scaled so as to be representative of the pressure in said reactor which will maintain the actual suction pressure for said first compressor substantially equal to the desired suction pressure represented by said nineteenth signal;

establishing a twentieth signal representative of the temperature of said feed stream flowing to said reactor;

establishing a twenty-first signal representative of the concentration of carbon dioxide in said feed stream flowing to said reactor;

establishing a twenty-second signal representative of the concentration of nitrogen in said feed stream flowing to said reactor;

establishing a twenty-third signal representative of the concentration of the acetic acid in said feed stream flowing to said reactor;

establishing a maximum safe operating pressure for said reactor in response to said twentieth through twenty-third signals and said sixth signal;

establishing a twenth-fifth signal equal to the one of said sixteenth, said nineteenth and said twenty-fourth signals which is representative of the lowest pressure; and manipulating the pressure in said reactor in response to said twenty-fifth signal.

10. A method in accordance with claim 8 additionally comprising the steps of:

providing a wash liquid to said condenser column, wherein said wash liquid removes vinyl acetate from the vapors contained in said condenser column;

establishing a fourteenth signal representative of the actual concentration of vinyl acetate in the overhead vapor stream withdrawn from said condenser column;

establishing a fifteenth signal representative of the desired concentration of vinyl acetate in said overhead vapor stream;

comparing said fourteenth signal and said fifteenth signal and establishing a sixteenth signal which is responsive to the difference between said fourteenth signal and said fifteenth signal, wherein said sixteenth signal is scaled so as to be representative of the flow rate of said wash fluid to said condenser column required to maintain the actual concentration of vinyl acetate in the overhead vapor stream withdrawn from said condenser column substantially equal to the desired concentration represented by said fifteenth signal; and manipulating the flow of said wash fluid to said condenser column in response to said sixteenth signal.

11. A method in accordance with claim 8 additionally comprising the steps of:

providing said bottom product from said condenser column to a flash tank;

withdrawing a product stream containing vinyl acetate and unreacted acetic acid from said flash tank;

providing the overhead vapors from said flash tank to the suction inlet of a second compressor;

providing the compressed vapors withdrawn from the discharge outlet of said second compressor to said condenser column;

establishing a fourteenth signal representative of the loading on said second compressor;

establishing a fifteenth signal representative of the maximum desired loading on said second compressor;

comparing said fourteenth signal and said fifteenth signal and establishing a sixteenth signal representative of the temperature of the reaction effluent entering said condenser column required to maintain the actual loading on said second compressor substantially equal to the maximum desired loading represented by said fifteenth signal;

establishing a seventeenth signal representative of a low limit on the temperature of the reaction effluent entering said condenser column;

establishing an eighteenth signal equal to the higher of said sixteenth and said seventeenth signals;

establishing a nineteenth signal representative of the actual temperature of the feed entering said condenser column;

comparing said said eighteenth and said nineteenth signals and establishing a twentieth signal which is responsive to the difference between said eighteenth signal and said nineteenth signal, wherein said twentieth signal is scaled so as to be representative of the cooling which must be applied to the reaction effluent withdrawn from said reactor in order for the actual temperature of the reaction effluent entering said condenser column to be equal to the desired temperature represented by said eighteenth signal; and manipulating the cooling of the reaction effluent withdrawn from said reactor in response to said twentieth signal.

12. A method in accordance with claim 11 additionally comprising the steps of:

withdrawing fluid from said condenser column and recycling the thus withdrawn fluid through a heat exchanger to said condenser column;

providing a cooling fluid to said heat exchanger;

establishing a twenty-first signal representative of the high limit on the magnitude of said twentieth signal;

comparing said twentieth signal and said twenty-first signal and establishing a twenty-second signal which is responsive to the difference between said twentieth signal and twenty-first signal, wherein said twenty-second signal is scaled so as to be representative of the flow rate of cooling fluid to said heat exchanger required to maintain a desired feed inlet temperature to said condenser column if sufficinet cooling is not available for the reaction effluent withdrawn from said reactor; and manipulating the flow of said cooling fluid to said heat exchanger in response to said twenty-second signal.

* * * * *